US007008989B2

(12) United States Patent
Sarkis et al.

(10) Patent No.: US 7,008,989 B2
(45) Date of Patent: Mar. 7, 2006

(54) ABRASION-RESISTANT POLYTETRAFLUOROETHYLENE TAPE

(75) Inventors: Paul E. Sarkis, Holland, PA (US); David Delgado, Levittown, PA (US)

(73) Assignee: Coltec Industrial Products, Inc., Charlotte, NC (US)

( * ) Notice: Subject to any disclaimer, the term of this patent is extended or adjusted under 35 U.S.C. 154(b) by 660 days.

(21) Appl. No.: 09/992,776

(22) Filed: Nov. 14, 2001

(65) Prior Publication Data

US 2002/0082320 A1 Jun. 27, 2002

Related U.S. Application Data

(60) Provisional application No. 60/248,453, filed on Nov. 14, 2000.

(51) Int. Cl.
C08K 3/18 (2006.01)

(52) U.S. Cl. ............... 524/430; 524/431; 524/432; 525/189; 525/190

(58) Field of Classification Search ........... 524/430, 524/431, 432; 525/189, 190
See application file for complete search history.

(56) References Cited

U.S. PATENT DOCUMENTS

| | | |
|---|---|---|
| 3,315,804 A | 4/1967 | Brauchla |
| 3,340,222 A | 9/1967 | Fang |
| 3,354,129 A | 11/1967 | Edmonds, Jr. et al. |
| 3,356,759 A | 12/1967 | Gerow |
| 3,391,221 A | 7/1968 | Gore et al. |
| 3,409,584 A | 11/1968 | Buschman et al. |
| 3,453,208 A | 7/1969 | Gallagher et al. |
| 3,573,089 A | 3/1971 | Tate |
| 3,616,177 A | 10/1971 | Gumerman |
| 3,620,368 A | 11/1971 | Comis |
| 3,622,376 A | 11/1971 | Tieszen et al. |
| 3,728,313 A | 4/1973 | Hill, Jr. et al. |
| 3,793,287 A | 2/1974 | Fitz et al. |
| 3,856,735 A | 12/1974 | Blackwell |
| 3,857,852 A | 12/1974 | Tieszen |
| 3,963,605 A | 6/1976 | Seabourn |
| 4,017,555 A | 4/1977 | Alvarez |
| 4,026,863 A | 5/1977 | Iseki et al. |
| 4,075,158 A | 2/1978 | Coale |
| 4,139,576 A | 2/1979 | Yoshimura et al. |
| 4,267,863 A | 5/1981 | Burelle |
| 4,270,964 A | 6/1981 | Flaskett |
| 4,362,069 A | 12/1982 | Giatras et al. |
| 4,362,585 A | 12/1982 | de Antonis et al. |
| 4,440,879 A | 4/1984 | Kawachi et al. |
| 4,477,647 A | 10/1984 | Mark et al. |
| 4,481,251 A | 11/1984 | Vratny |
| 4,503,005 A | 3/1985 | Ueno et al. |
| 4,542,187 A | 9/1985 | Dean |
| 4,543,392 A | 9/1985 | Kasahara et al. |
| 4,612,350 A | 9/1986 | Parker |
| 4,703,076 A | 10/1987 | Mori |
| 4,769,287 A | 9/1988 | Zaopo et al. |
| 4,809,641 A | 3/1989 | Plissonnier |
| 4,863,540 A | 9/1989 | Catalano et al. |
| 4,957,687 A | 9/1990 | Akman et al. |
| 4,963,609 A | 10/1990 | Anderson et al. |
| 5,006,594 A | 4/1991 | Rees |
| 5,006,597 A | 4/1991 | Luecke et al. |
| 5,100,493 A | 3/1992 | Leclere et al. |
| 5,106,673 A | 4/1992 | Effenberger et al. |
| 5,199,153 A | 4/1993 | Schulte-Ladbeck |
| 5,206,280 A | 4/1993 | Williams |
| 5,207,960 A | 5/1993 | Moret de Rocheprise |
| 5,210,377 A | 5/1993 | Kennedy et al. |
| 5,223,358 A | 6/1993 | Yamada et al. |
| 5,236,643 A | 8/1993 | Tseng et al. |
| 5,238,748 A | 8/1993 | Effenberger et al. |
| 5,240,615 A | 8/1993 | Fishman |
| 5,264,058 A | 11/1993 | Hoagland et al. |
| 5,320,789 A | 6/1994 | Nishii et al. |
| 5,382,399 A | 1/1995 | Moret de Rocheprise et al. |
| 5,393,929 A | 2/1995 | Yagihashi |
| 5,414,215 A | 5/1995 | Dunand et al. |
| 5,415,939 A | 5/1995 | Yeung |
| 5,429,869 A | 7/1995 | McGregor et al. |
| 5,501,827 A | 3/1996 | Deeney et al. |
| 5,518,676 A | 5/1996 | de Rocheprise |
| 5,636,551 A | 6/1997 | Davidson et al. |
| 5,645,940 A | 7/1997 | Teddington, Jr. et al. |
| 5,697,390 A | 12/1997 | Garrison et al. |
| 5,937,140 A | 8/1999 | Leonard et al. |
| 6,015,610 A | 1/2000 | Minor et al. |
| 6,306,493 B1 * | 10/2001 | Brownfield ............ 428/327 |

FOREIGN PATENT DOCUMENTS

| | | |
|---|---|---|
| DE | 4037875 | 6/1991 |
| DE | 4329395 | 3/1995 |

(Continued)

OTHER PUBLICATIONS

Patent Abstracts of Japan, Unexamined Applications, Jun. 27, 1986 (Japanese Patent No. 61-31447, Issued Feb. 13, 1986; Japanese Patent No. 61-31448, Issued Feb. 13, 1986; Japanese Patent No. 61-31449; Issued Feb. 13, 1986).

(Continued)

*Primary Examiner*—Edward J. Cain
(74) *Attorney, Agent, or Firm*—John M. Harrington; Kilpatrick Stockton LLP

(57) ABSTRACT

An abrasion resistant, laser-markable, tape comprising milled virgin polyphenylene sulfide resin, polytetrafluoroethylene and titanium dioxide, and optionally poly-p-oxybenzoate.

43 Claims, No Drawings

FOREIGN PATENT DOCUMENTS

| | | |
|---|---|---|
| EP | 0023047 A1 | 1/1981 |
| EP | 0023047 B1 | 4/1984 |
| EP | 0249082 | 12/1987 |
| EP | 0345032 | 12/1989 |
| EP | 0256422 | 7/1991 |
| EP | 0439734 A1 | 8/1991 |
| EP | 0447032 | 9/1991 |
| EP | 0488550 | 6/1992 |
| EP | 0367629 | 10/1992 |
| EP | 0199991 | 12/1992 |
| EP | 0439734 B1 | 12/1994 |
| EP | 0572320 | 1/1998 |
| FR | 2583564 | 12/1986 |
| FR | 2617325 | 10/1992 |
| FR | 2732030 | 9/1996 |
| GB | 1199574 | 7/1970 |
| GB | 2215116 A | 9/1989 |
| GB | 2215116 B | 7/1992 |
| JP | 63118357 | 5/1988 |
| JP | 6131448 | 5/1994 |
| NL | 2323799 | 5/1973 |
| WO | 90/08805 | 8/1990 |

OTHER PUBLICATIONS

Patent Abstracts of Japan, Unexamined Applications, Sep. 29, 1988 (Japanese Patent No. 63-118356; Issued May 23, 1988, Japanese Patent No. 63-118357, Issued May 23, 1988, Japanese Patent No. 63-118358, Issued May 23, 1988).

PCT International Search Report dated Mar. 21, 2002.

* cited by examiner

ABRASION-RESISTANT POLYTETRAFLUOROETHYLENE TAPE

This application claims the benefit of Provisional Application No. 60/248,453, filed Nov. 14, 2000.

BACKGROUND OF THE INVENTION

1. Field of the Invention

The present invention relates to a fluoropolymer tape possessing extraordinary abrasion resistance, good flexibility (without breakage), excellent dielectric properties, and which when laser marked demonstrates durable markings. More particularly, the present invention is directed to compositions of unsintered polytetraflouroethylene (PTFE) containing virgin, non-thermally cycled, polyphenylene sulfide milled to a particle size of less than about twenty-five microns. In a preferred embodiment the PTFE/polyphenylene sulfide mixture also contains a laser markable pigment, preferably a metal oxide. In a particularly useful PTFE tape, the PTFE composition comprises in addition a oxybenzoyl homopolyester (poly-p-oxybenzoate) which lends significantly improved abrasion resistance.

2. Background of the Related Art

Polytetrafluoroethylene (PTFE) tape is used in many applications including sealing joints, insulating conductive wires, and protecting materials from corrosive elements. PTFE demonstrates good chemical and heat resistance, and electrical insulation characteristics, as well as a low coefficient of friction. However, in general, it has less than desirable mechanical properties in particular with respect to abrasion resistance and compression strength.

There is a considerable need in the aerospace industry for wire and cable insulation that have a low dielectric constant, that are resistant to chemicals and solvents, can withstand large temperature variations, are light-weight and fire retardant, produce low smoke and fumes on combustion/melting, are easily stripped from the conductor, and that are generally safe for use. It is also desired that aerospace insulating materials take up as little room as possible, be flexible and be able to withstand considerable bending stresses.

Many of the insulation materials used in the aerospace industry comprise hexafluoropropylene, perfluoropropylene, or perfluorovinyl ethers. While these insulation materials have good chemical resistance to fluids with which they may come into contact, and possess good dielectric and weather properties, as well as many of the other properties sought out by the aerospace industry, they suffer from less than desirable mechanical properties in that they offer less than desired resistance to scrape abrasion and exhibit less than desirable resistance at temperatures above 180° C. (which may be encountered in avionic systems).

Given the many significant advantages proffered by fluoropolymers as insulators, numerous proposals have been suggested and adopted by the aerospace industry to address the mechanical deficiencies of the compounds.

One commonly used approach is to make composites which incorporate polyimide resins along with the fluoropolymers. Typically such insulation is based on polyimide films such as Kapton® which are coated or laminated over with tetrafluoroethylene polymers. The films are slit into tapes which may be taped over, or extruded over, the fluoropolymers. Fluoropolymers, such as polytetrafluoroethylene ("PTFE"), may also be co-extruded with fillers such as polyimide resins, polyamide-imide resins and polyamide resins and molded onto the wire or cable (See, e.g. EP 0 023 047; See, also, Japanese Patent Application No. 61-31448 which discloses a wear resistant polytetrafluoroethylene composition comprising polytetrafluoroethylene and a polyimideimidazopyrrolon resin).

Porous PTFE filled with abrasion resistant filler such as graphite has also been asserted to improve the longevity of PTFE wire/cable coverings (See, e.g., U.S. Pat. No. 5,636,551). The fluoropolymer may also be protected from abrasion by coating with a closed-cell polymer having better abrasion resistance (See, e.g., U.S. Pat. No. 5,210,377).

Japanese Patent Application No. 63-118357 discloses a tetrafluoroethylene resin composition comprising 50 to 90 weight percent tetrafluoroethylene resin with 10–50 weight percent fine powder of polyether ether ketone resin having a particle diameter of between 1 and 50 $\mu$m. The material is said to have excellent compression creep characteristics as well as sealing performance without impairing the low friction characteristics of the tetrafluoroethylene resin.

Several laminates and compositions are known to arc track under certain environmental conditions. Arc tracking is a catastrophic failure caused by an electrical arc when a short circuit occurs between the conductor and a conducting medium external to the insulation, such as a moderately conductive fluid. Arc tracking is a particular potential problem with polyimide-fluoropolymer insulations which employ TFE copolymers to bond layers. Use of PTFE/TFE copolymers as the binding agent between layers, as disclosed, for example, by U.S. Pat. No. 5,106,673, while somewhat diminishing arc tracking, has not been found to be entirely satisfactory.

Wire and cable in the aerospace industry also needs to be conspicuously labeled in order to permit easy replacement. Labeling of wire/cable in the aerospace industry is particularly important given the safety considerations involved, as well as the commonplace need for expeditious servicing of equipment. Labeling on wire and cables must be able to withstand the many environments to which the wire/cable may be exposed, and must remain with the wire/cable for its serviceable life. It is a general practice in the aerospace industry to mark individual electrical cables repeatedly along their length with identification numbers.

As fluoropolymers tend to be non-tacky, printing on such materials with conventional inks is difficult, and often less than permanent. Polyimides also suffer from less then desirable print fastness.

In order to improve fastness of inks, it has been proposed that the surface of the fluorine resin be modified by mix the fluorine resin (including PTFE) with a light-absorbing material (such as whole aromatic polyester, poly (ether ether ketone), polyamide, poly(ether ketone), poly(phenylene sulfide), aromatic polyamide, polyarylate, poly(ether imide), poly(amide imide), polysulfone, poly(ether sulfone), a metal oxide (such as zinc oxide, zirconia or titanium oxide), and metal sulfides (such as molybdenum disulfide)) and then irradiating laser light on the surface of the composite (See, U.S. Pat. No. 5,320,789). Such treatment is said to improve adhesion and wetting properties of numerous fluorine resins.

Hot stamp printing, while generally more permanent than ink printing, has the disadvantage that it degrades the thermal insulating properties of the cable which can cause arc tracking. Press-marking while somewhat more permanent than inks suffers in that the insulation is stretched at the press points, making the insulation more liable to peeling and breaking.

Marking of items using laser light has been known for some time (See, e.g., EP Patent Application No. 0 249 082 which teaches laser marking the keys of keyboards comprising a polycarbonate containing 10 to 50% of an aromatic polyester (which may be a condensate made from bisphenol-A terephthalic acid and butylene glycol)). It is therefore not surprising that a number of techniques have been developed to print marks onto the insulation of wires and cables using laser light.

One technique which has been employed entails coating the wire/cable with colored emulsions which change color when irradiated by a laser or that include an outer layer which is colored differently from an underlying area such that when the laser removes a portion of the outer layer the underlying differently colored underlayer becomes visible. For example, EP Patent Application No. 0 447 032 discloses a laser markable white pigment fluoropolymer (which includes PTFE) composition which includes a first pigment which is markable by ultraviolet laser and a second pigment which is non-absorbing in the ultraviolet region of the optical spectrum and which has a white appearance in the visible region of the optical spectrum. The first pigment may be antimony trioxide, titanium dioxide, polyethylethylketone (PEEK) and/or polyethylsulfone (PES), while the second pigment may be silicon dioxide, magnesium oxide, aluminum oxide and diamond. A preferred composition comprises from 1 to 35% by dry weight titanium dioxide and from 2 to 30% by dry weight second pigment.

U.S. Pat. No. 5,223,358 to Yamada et al. teaches laser marking (with light having a wavelength of 600 nm or less, thus including the ultraviolet range) a substrate coated with a fluororesin composition (including PTFE) comprising a high-molecular weight material having a benzene ring and at least one of a nitrogen atom, a sulfur atom and a carbonyl group in the main chain thereof (such as a polyamideimide, polyimides, polyparabanic acid, polyether imides, sulfone polymers such a poly sulfone, polyether sulfones and polyaryl sulfones, polyphenylene sulfide, polyether ether ketones, and polyoxybenzoyl). The laser light is said to cause a change in the color of the high-molecular weight material consistent with the irradiated surfaces (providing a difference in color between irradiated parts and unirradiated parts). Pigments such as titanium oxide in an amount of 0.1 to 20 parts by weight, or mica or pigment-coated mica in an amount of from 0.1 to 5 parts by weight per 100 parts by weight of the fluororesin composition may be added to the fluororesin composition.

It also known to non-aggressively mark fluoropolymer insulation that contains a photosensitive material such as titanium dioxide, zinc dioxide or tin dioxide (See, e.g., GB 2,215,116).

French Patent No. 2,732,030 discloses a PTFE insulation comprising uncured PTFE having 0.1 to 5.0% by weight titanium oxide pigments and 0.1 to 5.0% of an organic polymer chosen from the group comprising arylene sulfide polymers, in particular, polyphenylenesulfide, polyarylsulfones, polysulfone, polyethersulfone, and polyaryletherketones such as polyetherketone and polyetheretherketone. Such insulation material is said to be able to be marked with an ultraviolet laser to lend marking contrast reaching and exceeding 80%.

In U.S. Pat. No. 5,501,827, assigned to the assignee of the present application, a laser-markable composite material for application to wires and cables, and a process for fabricating the same, is disclosed. Such marked composition is taught to retain good color contrast after heat aging. The composite material comprises a polytetrafluoroethylene resin and a photosensitive filler material (e.g. titanium dioxide) along with an extrusion aid, the polytetrafluoroethylene resin being air-milled with the photosensitive filler material to a uniform dispersion, mixed with an extrusion aid, and then paste extruded to produce an object, direct coating, a tape, ribbon, etc. Such material is asserted to be more stable than heat aging than the prior art, with the disclosed material asserted to lose only about 10% of its contrast upon accelerated heat aging as compared to the prior art which lost nearly 50%.

While the prior art suggests different compositions and methods for improving the hardness of PTFE-based insulation and improving the laser markability of such materials, and while PTFE-based insulation on the whole are believed to have good chemical resistance and fire retardance, it is generally desired in the art that presently available PTFE-based insulation be improved with respect to dielectric behavior, temperature and weather resistance, marking stability, and with respect to the possession of both toughness and flexibility properties.

SUMMARY OF THE INVENTION

The present invention provides a fluoropolymer-based composition, that provides extraordinary abrasion resistance, good flexibility (without breakage), and which when laser marked demonstrates durable markings. A process for making such composition is also disclosed. Such composition comprises from about 1 to about 6% virgin, unsintered, polyphenylene sulfide resin, from about 0 to about 3% poly-p-oxybenzoate, from about 1 to about 6% of a metal oxide in conjunction with a fluoropolymer-base (percentages based on the weight of the fluoropolymer).

Surprisingly, the present inventors have discovered that PTFE-filled unsintered tapes which comprise a uniform dispersion of non-thermally cycled polyphenylene sulfide milled to an average particle size of about 1 to about 20 microns when sintered provide a unexpectedly good degree of flexibility and durability. Such properties are significantly better than PTFE alone, and PTFE compositions containing milled polyphenylene sulfide which is heated-treated prior to milling, or milled to an average particle size of greater than about 25 microns, or is not uniformly dispersed with the PTFE.

Significant improvement in durability and insulative properties is further seen upon the addition of 1 to 3% by weight, based on the weight of the fluoropolymer, poly-p-oxybenzoate (PPOB) to the PTFE:PPS composition. Preferably the PPOB is also uniformly dispersed in the composition (uniform dispersion believed to further improve such characteristics). The uniform dispersion of a metal oxide, preferably titanium dioxide, to the PTFE:PPS or PTFE:PPS:PHB mixture at a concentration about 1 to about 9%, by weight, based on the weight of the fluoropolymer, was seen to greatly improve laser markability of the unsintered composition and to improve the stability of such marks upon heat aging.

By "tape" it is meant a narrow flexible strip or band of material. By tape it is meant to include ribbon. By "uniformly dispersed" it is meant that one material is dispersed throughout another material in a substantially uniform manner. By "average particle size" it is meant the mean of the widest dimension of a population of particles.

In one embodiment of the present invention there is disclosed a fluoropolymer-based tape comprising a fluoropolymer, about 1 to about 6 percent by weight, based on the weight of the fluoropolymer, of virgin, unsintered, polyphenylene sulfide resin, and about 1 to about 3 percent by weight, based on the weight of the fluoropolymer, of a poly-p-oxybenzoate. The fluoropolymer-based tape of such embodiment may further comprise between about one to about three percent by weight, based on the weight of the fluoropolymer, of a metal oxide in order to improve laser markability. The metal oxide preferably is a photosensitive metal oxide, preferably selected from the group consisting of: titanium dioxide, zinc oxide and tin oxide.

Unexpectedly good physical properties are noted when the polyphenylene sulfide resin has an average particle size of about 1 to about 20 microns, more preferably an average particle size of about 10 microns. It is further preferred that the polyphenylene sulfide has a particle distribution size range of about 0.02 to about 60 microns, more preferably a particle distribution size range of about 0.75 to about 25 microns. A preferred fluoropolymer is polytetrafluoroethylene. Initially the tape is produced in an unsintered state, i.e. with unsintered material. The tape may subsequently be sintered to eventuate in a durable material.

In an another embodiment of the present invention, there is disclosed a fluoropolymer-based tape comprising: (a) a fluoropolymer; (b) about 1 to about 6 percent by weight, based on the weight of the fluoropolymer, of virgin, unsintered, polyphenylene sulfide resin; and (c) from about 0 to about 3 percent by weight of a poly-p-oxybenzoate. The fluoropolymer-based tape of this embodiment may further comprise between about one to about three percent by weight, based on the weight of the fluoropolymer, of a metal oxide to improve laser markability. Preferably the metal oxide is a photosensitive metal oxide, which may be selected from the group consisting of: titanium dioxide, zinc oxide and tin oxide. Advantageously the fluoropolymer-based tape of such embodiment comprises polyphenylene sulfide having an average particle size of about 1 to about 20 microns, more preferably about 10 microns. The polyphenylene sulfide further preferably has a particle distribution size range of about 0.02 to about 60 microns., more preferably a particle distribution size range of about 0.75 to about 25 microns. A preferred fluoropolymer is polytetrafluoroethylene. Initially the tape is produced in an unsintered state, i.e. with unsintered material. The tape may subsequently be sintered to eventuate in a durable material.

Also disclosed is a method for producing a laser markable material useful for electrical cables and insulated conductors said process including the steps of: (a) selecting a particulate polyphenylene sulfide having a mean particle size of about 1 to about 20 microns; (b) selecting a particulate photosensitive material having a mean particle size than 3 microns; (c) mixing the particulate polyphenylene sulfide and photosensitive material with a fine powder paste extrudable polytetrafluoroethylene resin; (d) air milling the mixture produced in step (c) to produce a uniform dispersion of said polyphenylene sulfide, said photosensitive material, and said polytetrafluoroethylene resin; (e) blending the uniform dispersion produced in step (d) with an extrusion aid comprising a hydrocarbon solvent to produce a blend having a composition of about 2 to about 9 percent by weight, based on the weight of the polytetrafluoroethylene resin, of the photosensitive material, about 1 to about 3 percent by weight, based on the weight of the polytetrafluoroethylene resin, of said polyphenylene sulfide, about 8 to about 23% by weight, based on the weight of the polytetrafluoroethylene resin, extrusion aid, and the balance polytetrafluoroethylene resin; (f) forming the blend of step (e) into a preform suitable for paste extrusion; and (g) paste extruding said preform to produce a uniformly photosensitive material:polyphenylene sulfide filled polytetrafluoroethylene resin material having a selected configuration. Preferred photosensitive materials for such method may be selected from the group consisting of $TiO_2$, $SnO_2$, and ZnO. When the photosensitive material is titanium dioxide, the titanium dioxide preferably has a rutile crystal structure with a purity greater than 90%. The hydrocarbon solvent utilized may be selected from the group consisting of: light petroleum distillate, mineral oil, kerosene and naptha. The selected configuration made from the preform may be selected from the group consisting of tapes and tubing. The preform may be paste extruded directly onto an electrical conductor. The material may then be sintered, and exposed to laser radiation for encoding the material. Also disclosed are the materials produced by the various combinations of processes encompassed by such process.

There is also disclosed a method for producing a laser markable material useful for electrical cables and insulated conductors said process including the steps of: (a) selecting a particulate polyphenylene sulfide having a mean particle size of about 1 to about 20 microns; (b) selecting a particulate photosensitive material having a mean particle size less than 3 microns; (c) selecting poly-p-oxybenzoate; (d) mixing the particulate polyphenylene sulfide and photosensitive material and poly-p-oxybenzoate with a fine powder paste extrudable polytetrafluoroethylene resin; (e) air milling the mixture produced in step (d) to produce a uniform dispersion of said polyphenylene sulfide, said photosensitive material, and said polytetrafluoroethylene resin; (f) blending the uniform dispersion produced in step (e) with an extrusion aid comprising a hydrocarbon solvent to produce a blend having a composition of about 2 to about 9 percent by weight, based on the weight of the polytetrafluoroethylene resin, of the photosensitive material, about 1 to about 3 percent by weight, based on the weight of the polytetrafluoroethylene resin, of said polyphenylene sulfide, about 8 to about 23% by weight, based on the weight of the polytetrafluoroethylene resin, extrusion aid, from about 1 to about 3% poly-p-oxybenzoate, by weight, based on the weight of the polytetrafluoroethylene resin, and the balance polytetrafluoroethylene resin; (g) forming the blend of step (f) into a preform suitable for paste extrusion; and (h) paste extruding said preform to produce a uniformly filled photosensitive-material: polyphenylene sulfide polytetrafluoroethylene resin material having a selected configuration. Preferred photosensitive materials for such method may be selected from the group consisting of $TiO_2$, $SnO_2$, and ZnO. When the photosensitive material is titanium dioxide, the titanium dioxide preferably has a rutile crystal structure with a purity greater than 90%. The hydrocarbon solvent utilized may be selected from the group consisting of: light petroleum distillate, mineral oil, kerosene and naptha. The selected configuration made from the preform may be selected from the group consisting of tapes and tubing. The preform may be paste extruded directly onto an electrical conductor. The material may then be sintered, and exposed to laser radiation for encoding the material. Also disclosed are the materials produced by the various combinations of processes encompassed by such process.

DETAILED DESCRIPTION OF THE INVENTION

The present invention overcomes many of the problems associated with prior art PTFE-filled compositions, providing the ability to fabricate PTFE-based tapes with unexpectedly high abrasion resistance, flexibility, durability, and stretchability (without breakage), resistance to wear failure, heat aging and weathering, and good insulation properties, laser-markability and resistance to mark fade. Such improved composition is attained by mixing fine powdered PTFE with virgin PPS milled to an average particle size of less than 25 microns. Preferably, the virgin PPS is milled to an average particle size of about 1 to about 20 microns, more preferably about 5 to about 15 microns, and yet more preferably about 8 to about 12 microns (the latter two ranges unexpectedly improving the physical properties of the tapes/ribbons). In a particularly preferred tape, the thickness of the tape is between about $5.08 \times 10^{-3}$ cm to about $6.62 \times 10^{-3}$ cm (about 1 to about 3 mils).

The present inventors have discovered that a superior PTFE tape having a thickness of between about $5.08 \times 10^{-3}$ cm to about $6.62 \times 10^{-3}$ cm can be manufactured when virgin PPS is milled (preferably by air-milling) to an average particle size of between about 1 to about 20 microns, subsequently (or concurrently) air-milled with fine powdered PTFE resin to produce a uniform dispersion of the PPS in the fine powder PTFE resin, blending the dispersion with an extrusion aid comprising a hydrocarbon solvent to form a blend having a composition based on the weight of the fluoropolymer of about 1 to about 6 percent milled PPS, 8 to 23 percent extrusion aid, and any other material added to the dispersion, such as fillers, extenders, actives etc., and then forming the mixture into a preform suitable for paste extrusion, and subsequently paste extruding the preform to produce a material-filled PTFE tape of the desired dimension. PPS particles having a larger average particle size than 20 microns were found to lead to a reduction in certain advantageous properties of the 1 to 3 mil tape. For example, incorporation into the tape of PPS particles having an average particle size of greater than about 20 microns may result in a reduction of the tensile strength of the tape and a diminishment in the insulative properties of the tape both in the sintered and unsintered state.

While not bound by such theory, the present inventors have hypothesized that the improvements seen with respect to the unsintered and sintered tape relate to a more uniform dispersion of the PPS in the PTFE resin which may relate to particle size as well as the method used to disperse the materials. The uniform dispersion and PPS particle sizes are hypothesized to reduce aggregation of the PPS particles in the unsintered tape, thereby reducing areas PTFE discontinuity, and which may result in the sintered state in an improved PPS polymeric network.

Surprisingly, the present inventors have further discovered that by incorporating from about 0.5 to 3.0% by weight, based on the weight of the fluoropolymer (in particular PTFE), poly-p-oxybenzoate (p-oxybenozyl homopolyester) ("PPOB") into the PPS:PTFE composition, enhanced dielectric properties of material are achieved as well as an improvement in durability of the tape. Resistance to certain solvents is also improved.

In a preferred embodiment of the present invention a photosensitive metal oxide, in particular titanium dioxide, is added to the PPS:PTFE composition with or without PPOB. Other suitable photosensitive metal oxides includes $SnO_2$ or ZnO. Such materials provide enhanced laser markability in particular when air milled as described in commonly assigned U.S. Pat. No. 5,501,827. Surprisingly as low as about 1% titanium dioxide, by weight, based on the weight of the fluoropolymer, in the mix has been found to be sufficient for enhanced laser markability of the material. Titanium dioxide concentrations (w/w) in excess of about 4% by weight (based on the weight of the fluoropolymer) have not been found to significantly enhance laser markability in the compositional ranges recited and in fact darken the material to such an extent that the contrast level is reduced. As the concentration of PPS and/or PPOB increases the tape becomes darker progressing from a white to a dark brown color. A PPS:PTFE composition (with or without PPOB) containing titanium oxide may be laser marked in both the unsintered and sintered state.

The PTFE tape of the present invention may be used to wrap an entire wire, or be used as an initial, intermediate or final wrap of the wire. PTFE tape is often used conventionally as a final wrap to form the exterior jacket of a wire. As the exterior jacket of a wire is most likely to first come into contact with sharp edges inside an aerospace craft, and other objects, it is preferred that such exterior jacket be durable. On the same token, it is important that the jacket have sufficient flexibility such that it does not crack or break upon bending. The present compositions provide for an exterior jacket that is less susceptible to scratches and cuts during installation and less rubbing wear while in service.

In the formulation of the disclosed compositions, commercially available PPOB, such as Ekonol® (Norton Performance Plastics Corp.®), may be used. On the other hand, it has been found that commercially-available PPS, such as Ryton® (Phillips 66®) or Fortron® (Ticona®), which are sold as a heat-treated products often mixed with glass, can not advantageously be employed in the present invention. Heat-treated/glass compositions of PPS were found not to readily mill into the particle sizes found useful in the present invention. In fact, it was found that the milling process necessary to reduce such materials to the desired particle sizes was simply uneconomical. Virgin, "V-1" type, PPS (available from the manufactures of Ryton®) which is not toughened or mixed with glass was found to be millable to the appropriate particle sizes by air-milling using a Trost air mill. Virgin PPS also has the added advantage of being whiter than commercially-available tempered grades.

A particularly preferred composition of the present invention comprises 92–97% (w/w) PTFE, 1–3% (w/w) titanium dioxide, 1–3% (w/w) virgin grade PPS air-milled, 0.5–1.5% (w/w) PPOB, which has advantageously been used to fabricate 2–3 mil tape.

In a preferred manufacturing process, virgin grade PPS is air-milled to a particle size of 1 to about 20 microns. Air milling may be undertaken using an air impact pulverizer, air mill or jet mill sold under the TROST name. Subsequently the air-milled PPS and any other additives are dry mixed with fine powder PTFE resin in a Patterson Kelly blender. Preferably the PTFE resin is a fine powder having a mean particle diameter of about 450 to about 550 microns, more preferably about 500 microns. The dry-mixed material is then air milled to ensure a thorough and microscopically homogenous distribution of the blend. A hydrocarbon lubricant is then blended into the homogeneously distributed blend. The wet mixed material is then compressed into a solid billet or preform in preparation for the extrusion process.

Preforms are extruded under pressure, and through an extrusion die, into a continuous length of tape. The thick tape is then calendared to the desired thickness (typically 2 to 3 mils). After calendaring, the tape is passed over a series of heated rolls where the lubricant is evaporated from the tape. As the tape exits the extrusion line, it is wound on a large (jumbo) roll lengthwise. The jumbo is then slit lengthwise on commercially available slitting/winding equipment to form long lengths of tape As would be understood by one of ordinary skill in the art, virtually any solid material that will withstand the processing temperatures can be used to form a solids-solids dispersion with the PTFE resin and can be used as an additive to the PTFE resin in accord with present invention.

EXAMPLE 1

Ryton® V-1 (virgin grade) was air-milled to a particle size distribution of between about 0.5 to about 11.25 microns, with an average particle size of about 10 microns. Titanium dioxide of rutile crystal structure with a purity greater than 90% and a mean particle size less than about 3 microns was added. Ekonol® with a particle size less than about 25 microns was added. The titanium dioxide, milled-Ryton® V-1, and Ekonol® were added to fine powdered PTFE to produce a composition containing 95.23% PTFE, 1.91% titanium dioxide, 1.91% Ryton®V-1 (air-milled by Plastomer) and 0.95% Ekonol®. The mixture was then blended for 5 to 10 minutes, and subsequently air-milled in a TROST mill. One hundred parts of the mixture was then blended with from 10 to 25 parts of a light petroleum distillate solvent (mineral oil, kerosene, and naptha could also be used as extrusion aid in a Twin-Shell Liquids-Solids Blender). The resulting mixture was then formed at low pressure into a preform suitable for paste extrusion. The preform was subsequently loaded into paste extrusion equipment and extruded into a tape. The tape was then slit to produce several tapes. Slit-tape was then wrapped onto a conductor. The composite material on the conductor was then sintered. Processes and equipment for forming a preform, extruding and subsequent sintering are well known to those of ordinary skill in the art.

While the invention has been described with respect to preferred embodiments, those skilled in the art will readily appreciate that various changes and/or modifications can be made to the invention without departing from the spirit or scope of the invention as defined by the appended claims. All documents cited herein are incorporated in their entirety herein.

What is claimed is:

1. A fluoropolymer-based tape comprising:
   (a) a fluoropolymer;
   (b) about 1 to about 6 percent by weight, based on the weight of the fluoropolymer, of virgin, unsintered, polyphenylene sulfide resin, wherein the polyphenylene sulfide resin has an average particle size of less than about 25 microns;
   (c) about 1 to about 3 percent by weight, based on the weight of the fluoropolymer, of a poly-p-oxybenzoate.

2. The fluoropolymer-based tape of claim 1 further comprising between about one to about three percent by weight, based on the weight of the fluoropolymer, of a metal oxide.

3. The fluoropolymer-based tape of claim 2 wherein the metal oxide is a photosensitive metal oxide.

4. The fluoropolymer-based tape of claim 3 wherein the photosensitive metal oxide is selected from the group consisting of: titanium dioxide, zinc oxide and tin oxide.

5. The fluoropolymer-based tape of claim 1 wherein the polyphenylene sulfide resin has an average particle size of about 1 to about 20 microns.

6. The fluoropolymer-based tape of claim 5 wherein the polyphenylene sulfide resin has an average particle size of about 10 microns.

7. The fluoropolymer-based tape of claim 5 wherein the polyphenylene sulfide has a particle distribution size range of about 0.02 to about 60 microns.

8. The fluoropolymer-based tape of claim 7 wherein the polyphenylene sulfide has a particle distribution size range of about 0.75 to about 25 microns.

9. The fluoropolymer-based tape of claim 1 wherein the fluoropolymer is polytetrafluoroethylene.

10. A fluoropolymer-based tape of claim 1 which is sintered or unsintered.

11. A fluoropolymer-based tape comprising:
    (a) a fluoropolymer;
    (b) about 1 to about 6 percent by weight, based on the weight of the fluoropolymer, of virgin, unsintered, polyphenylene sulfide resin, wherein the polyphenylene sulfide resin has an average particle size of less than about 25 microns;
    (c) from about 0.5 to 1.5 percent by weight of a poly-p-oxybenzoate.

12. The fluoropolymer-based tape of claim 11 further comprising between about one to about three percent by weight, based on the weight of the fluoropolymer, of a metal oxide.

13. The fluoropolymer-based tape of claim 12 wherein the metal oxide is a photosensitive metal oxide.

14. The fluoropolymer-based tape of claim 13 wherein the photosensitive metal oxide is selected from the group consisting of: titanium dioxide, zinc oxide and tin oxide.

15. The fluoropolymer-based tape of claim 11 wherein the polyphenylene sulfide resin has an average particle size of about 1 to about 20 microns.

16. The fluoropolymer-based tape of claim 15 wherein the polyphenylene sulfide resin has an average particle size of about 10 microns.

17. The fluoropolymer-based tape of claim 15 wherein the polyphenylene sulfide has a particle distribution size range of about 0.02 to about 60 microns.

18. The fluoropolymer-based tape of claim 17 wherein the polyphenylene sulfide has a particle distribution size range of about 0.75 to about 25 microns.

19. The fluoropolymer-based tape of claim 11 wherein the fluoropolymer is polytetrafluoroethylene.

20. The fluoropolymer-based tape of claim 11 which is sintered or unsintered.

21. A method for producing a material useful for electrical cables and insulated conductors said process including the steps of:
    (a) selecting a particulate polyphenylene sulfide having a mean particle size of about 1 to about 20 microns;
    (b) selecting a particulate photosensitive material having a mean particle size less than 3 microns;
    (c) mixing the particulate polyphenylene sulfide and photosensitive material with a fine powder paste extrudable polytetrafluoroethylene resin;
    (d) air milling the mixture produced in step (c) to produce a uniform dispersion of said polyphenylene sulfide, said photosensitive material, and said polytetrafluoroethylene resin;
    (e) blending the uniform dispersion produced in step (d) with an extrusion aid comprising a hydrocarbon solvent to produce a blend having a composition of about 2 to about 9 percent by weight, based on the weight of the polytetrafluoroethylene resin, of the photosensitive material, about 1 to about 6 percent by weight, based on the weight of the polytetrafluoroethylene resin, of said polyphenylene sulfide, about 8 to about 23% by weight, based on the weight of the polytetrafluoroethylene resin, extrusion aid, and the balance polytetrafluoroethylene resin;
    (f) forming the blend of step (e) into a preform suitable for paste extrusion; and
    (g) paste extruding said preform directly onto an electrical conductor to produce a uniformly photosensitive material:polyphenylene sulfide filled polytetrafluoroethylene resin material having a selected configuration.

22. The method as recited in claim 21, wherein said photosensitive material is selected from the group consisting of $TiO_2$, $SnO_2$, and ZnO.

23. The method as recited in claim 22, wherein said photosensitive material is titanium dioxide having a rutile crystal structure with a purity greater than 90%.

24. The method as recited in claim 21, wherein said hydrocarbon solvent is selected from the group consisting of: light petroleum distillate, mineral oil, kerosene and naptha.

25. The method as recited in claim 21, wherein said selected configuration is selected from the group consisting of tapes and tubing.

26. The method as recited in claim 21, further comprising the step of sintering the material produced in step g.

27. The method as recited in claim 26 further including the step of exposing the sintered material to laser radiation to encode said material.

28. The material produced by the process of claim 21.

29. The material produced by the process of claim 23.

30. The material produced by the process of claim 25.

31. The material produced by the process of claim 26.

32. A method for producing a material useful for electrical cables and insulated conductors said process including the steps of:
- (a) selecting a particulate polyphenylene sulfide having a mean particle size of about 1 to about 20 microns;
- (b) selecting a particulate photosensitive material having a mean particle size greater than 3 microns;
- (c) selecting poly-p-oxybenzoate;
- (d) mixing the particulate polyphenylene sulfide and photosensitive material and poly-p-oxybenzoate with a fine powder paste extrudable polytetrafluoroethylene resin;
- (e) air milling the mixture produced in step (d) to produce a uniform dispersion of said polyphenylene sulfide, said photosensitive material, and said polytetrafluoroethylene resin;
- (f) blending the uniform dispersion produced in step (e) with an extrusion aid comprising a hydrocarbon solvent to produce a blend having a composition of about 2 to about 9 percent by weight, based on the weight of the polytetrafluoroethylene resin, of the photosensitive material, about 1 to about 6 percent by weight, based on the weight of the polytetrafluoroethylene resin, of said polyphenylene sulfide, about 8 to about 23% by weight, based on the weight of the polytetrafluoroethylene resin, extrusion aid, from about 1 to about 3% poly-p-oxybenzoate, and the balance polytetrafluoroethylene resin;
- (g) forming the blend of step (f) into a preform suitable for paste extrusion; and
- (h) paste extruding said preform to produce a uniformly photosensitive material:polyphenylene sulfide filled polytetrafluoroethylene resin material having a selected configuration.

33. The method as recited in claim 32 wherein said photosensitive material is selected from the group consisting of $TiO_2$, $SnO_2$, and ZnO.

34. The method as recited in claim 32 wherein said photosensitive material is titanium dioxide having a rutile crystal structure with a purity greater than 90%.

35. The method as recited in claim 32, wherein said hydrocarbon solvent is selected from the group consisting of: light petroleum distillate, mineral oil, kerosene and naptha.

36. The method as recited in claim 32 wherein said selected configuration is selected from the group consisting of tapes and tubing.

37. The method as recited in claim 32, wherein said preform is paste extruded directly onto an electrical conductor.

38. The method as recited in claim 32, further comprising the step of sintering the material produced in step h.

39. The method as recited in claim 38 further including the step of exposing the sintered material to laser radiation to encode said material.

40. The material produced by the process of claim 32.

41. The material produced by the process of claim 33.

42. The material produced by the process of claim 38.

43. The material produced by the process of claim 39.

* * * * *